Figure 1:
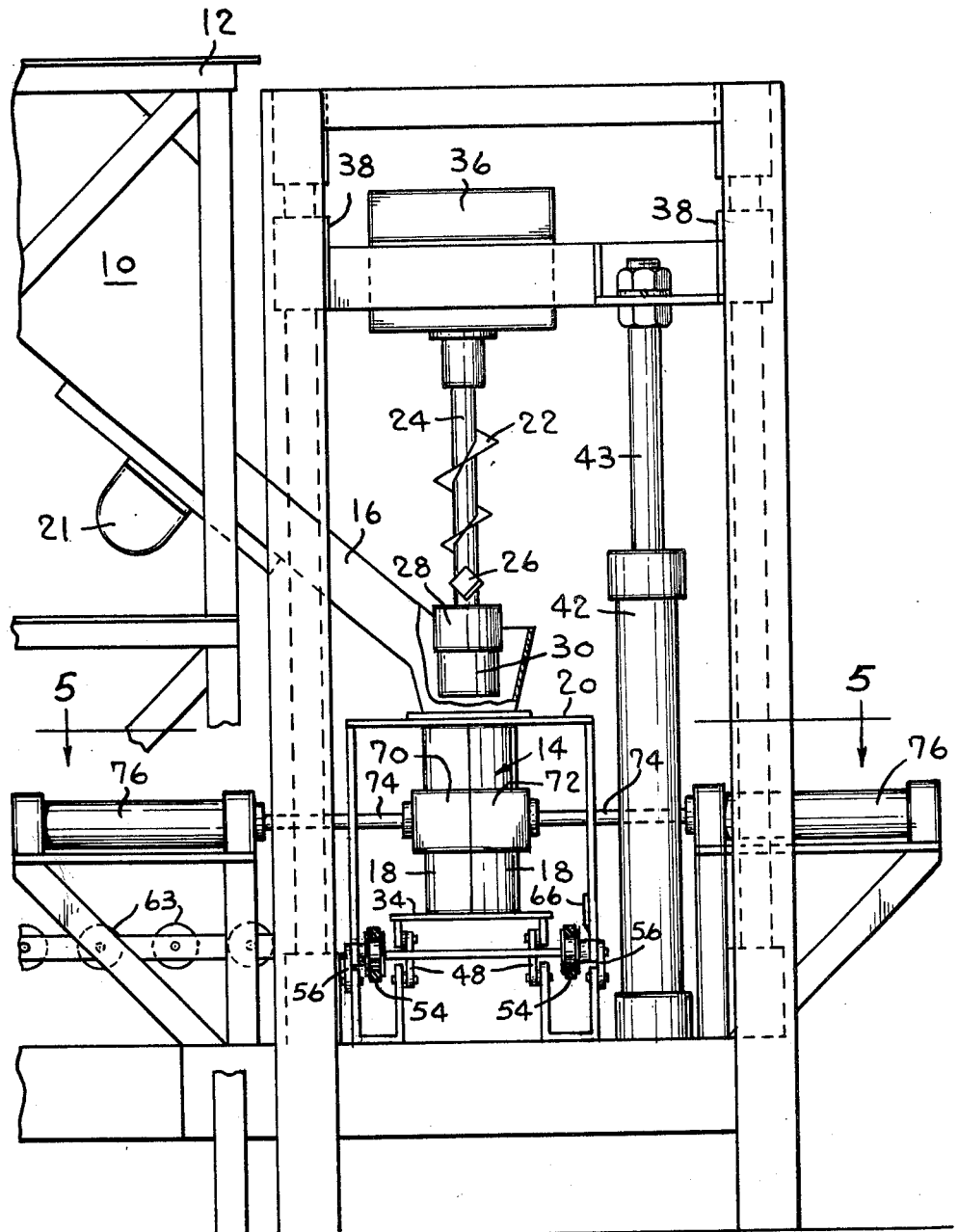

April 6, 1965 D. W. DENNIS ETAL 3,176,369
AUTOMATIC MOLDING MACHINE
Filed Nov. 10, 1961 6 Sheets-Sheet 1

INVENTORS
DARWIN W. DENNIS
WILLIAM G. BECK
BY John M. Michael
ATTORNEY

April 6, 1965   D. W. DENNIS ETAL   3,176,369
AUTOMATIC MOLDING MACHINE

Filed Nov. 10, 1961   6 Sheets-Sheet 5

INVENTORS
DARWIN W. DENNIS
WILLIAM G. BECK
BY John W. Michael
ATTORNEY

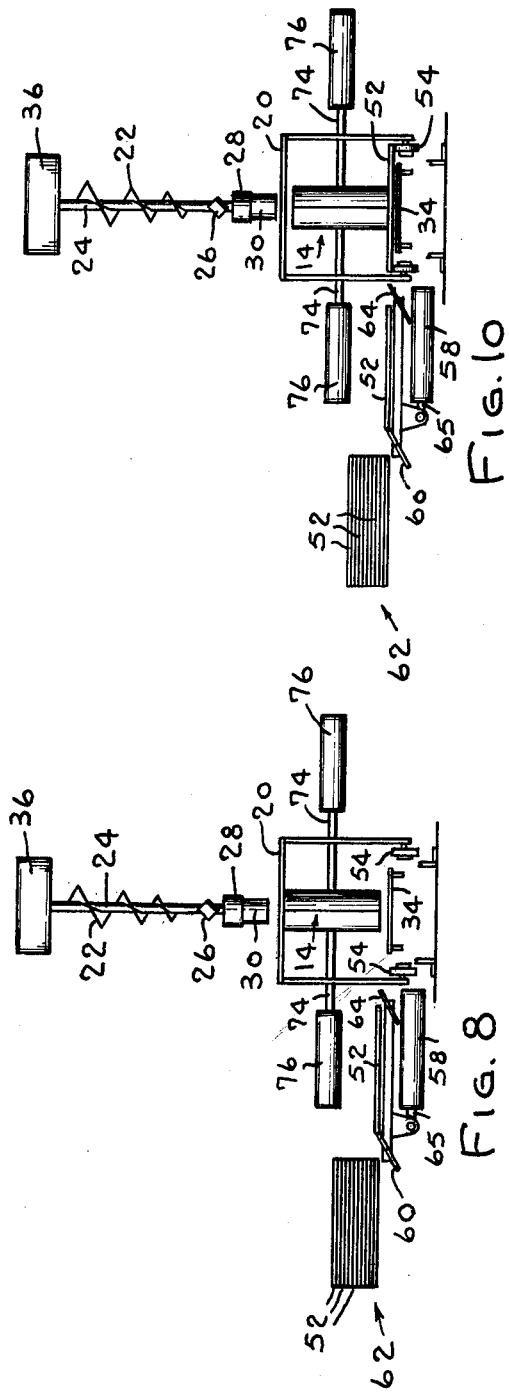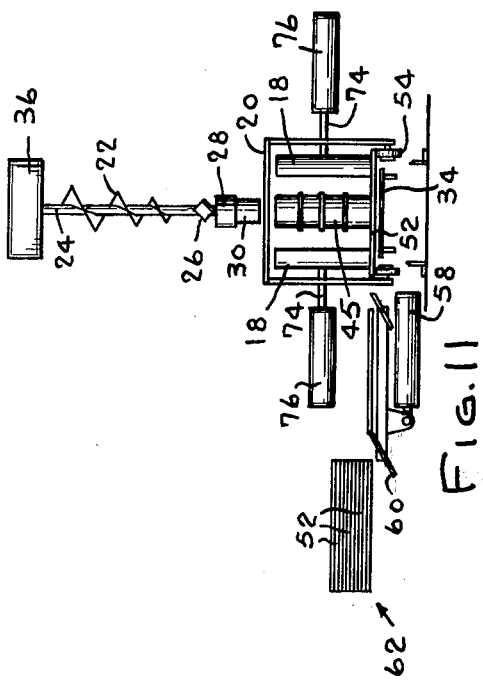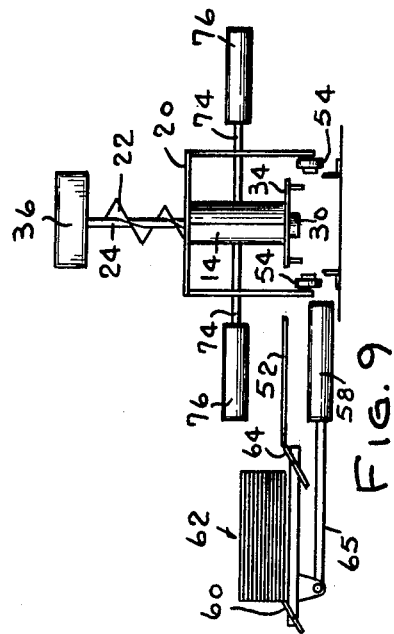

United States Patent Office 3,176,369
Patented Apr. 6, 1965

3,176,369
AUTOMATIC MOLDING MACHINE
Darwin W. Dennis, Saginaw, and William G. Beck, Bay City, Mich., assignors to Concrete Engineering and Machinery Incorporated, Bay City, Mich., a corporation of Michigan
Filed Nov. 10, 1961, Ser. No. 151,565
8 Claims. (Cl. 25—36)

This invention relates to molding machines and is particularly concerned with the automatic fabrication of concrete drain tiles.

The manufacture of drain tiles has been automated to the extent that concrete is fed, formed and compacted automatically in preformed molds or cans. These cans are primarily of a one-piece construction held together by a latch. The can is manually placed in the machine, the concrete is fed into the can and the drain tile formed therein. The can must then be removed from the machine to a pallet, the latch opened, the can lifted off of the tile, the latch closed and the can returned to the machine all by hand labor. The cans are relatively thin to reduce the weight of the can so they can be handled easily which makes them subject to considerable damage because of the large amount of handling resulting in excessive repair and replacement costs.

The primary object of this invention is to provide a fully automatic process and machine for fabricating drain tiles.

Another object is to provide a rugged mold that is not subject to damage thus reducing repair and replacement costs to a minimum.

Another object is to provide an automatic drain tile molding machine that provides larger manufacturing capacities than previously experienced in the field.

Another object of this invention is to provide an automatic drain tile molding machine that reduces manual labor to a minimum in the manufacture of concrete drain tiles.

These objects are attained by providing a mold in combination with pallet support means which are capable of freely setting the cast drain tile on a pallet without moving the tile in respect to the casting machine. The drain tile forming machines known heretofore either loosened the mold side sections and permitted the cast tile to drop or slide onto a pallet, or removed the top and side sections of the mold and permitted the drain tile to rest on the bottom section of the mold from which it had to be removed and manually placed on a pallet. One of the inherent disadvantages of this type of machine is that such movement or handling of the still wet and semi-solid tile frequently causes its damage by deformation or cracking. Also, the method of placing the tile on a pallet invariably involves time consuming handling and/or complicated mechanisms. The present invention eliminates this source of damage and provides a simpler and more efficient tile forming machine by utilizing a mold from which the bottom section may be removed, while the other mold sections still hold the tile in the "as-cast" position, and by providing means to position a pallet in contact with the tile and side sections of the mold; whereafter, the other mold sections may be automatically removed to freely permit the tile to rest on the pallet. The pallet and tiles may be then removed either to be cured, stored or processed further.

Figure 2:
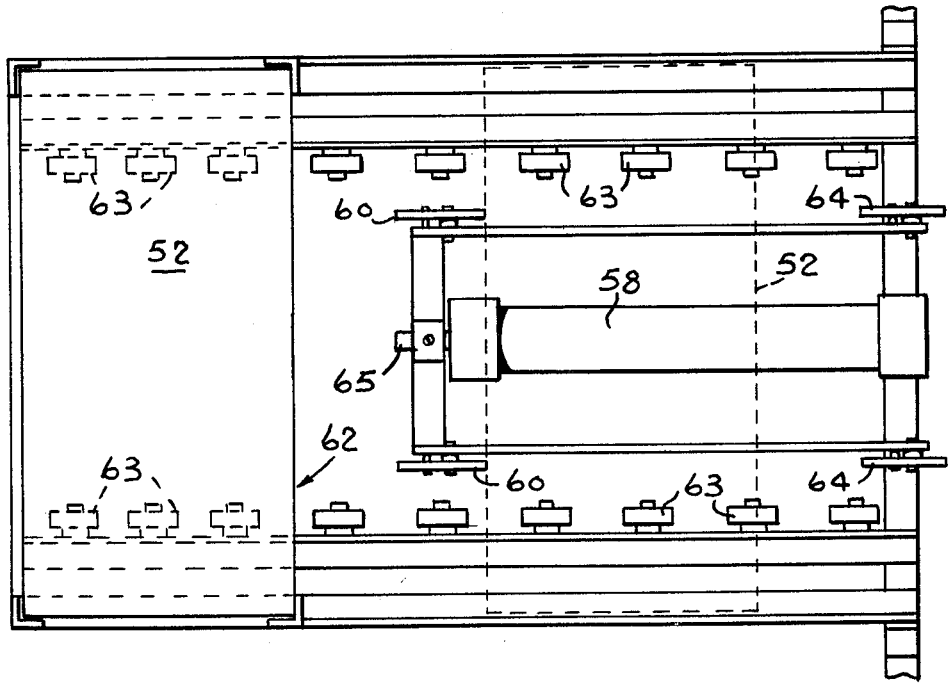
Figure 3:
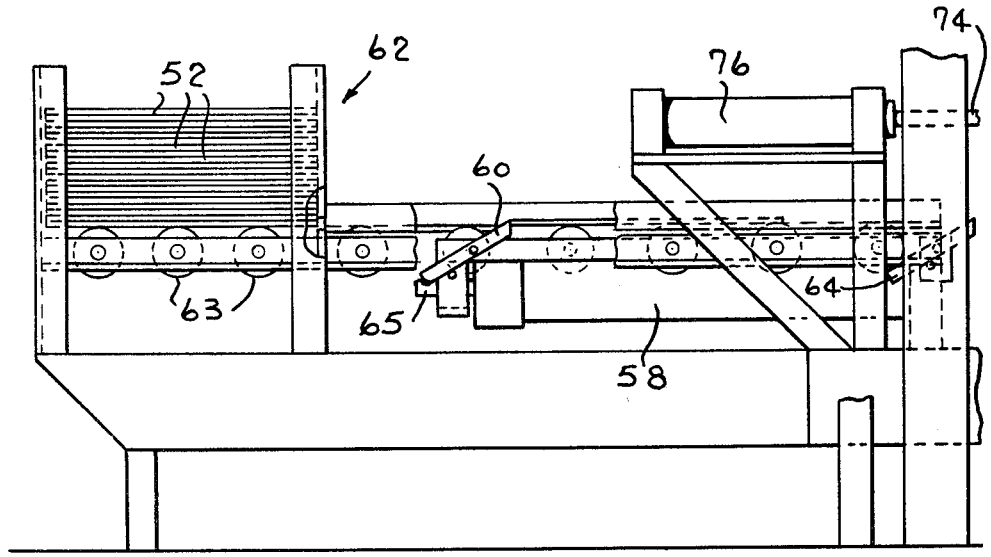
Figure 4:
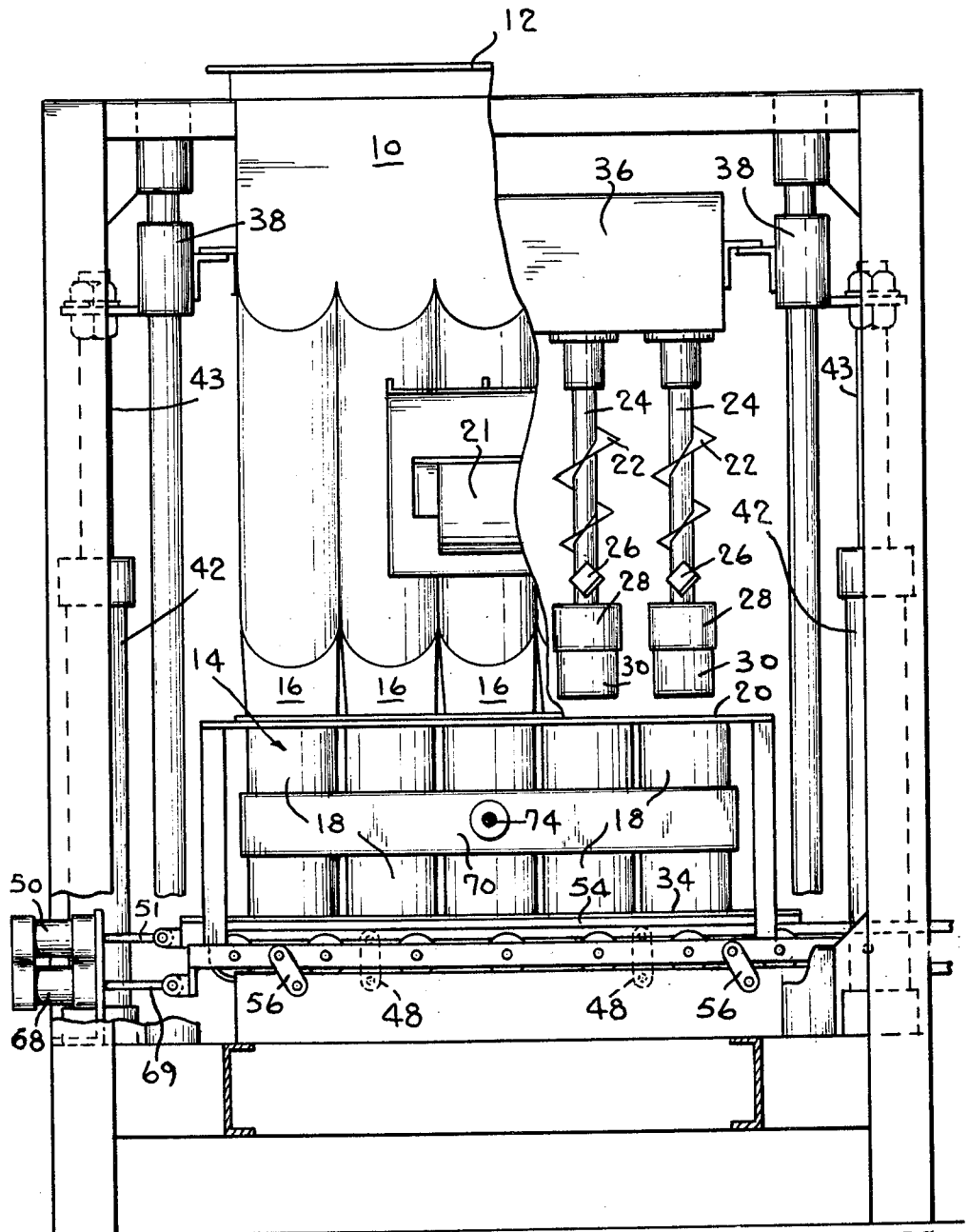
Figure 5:
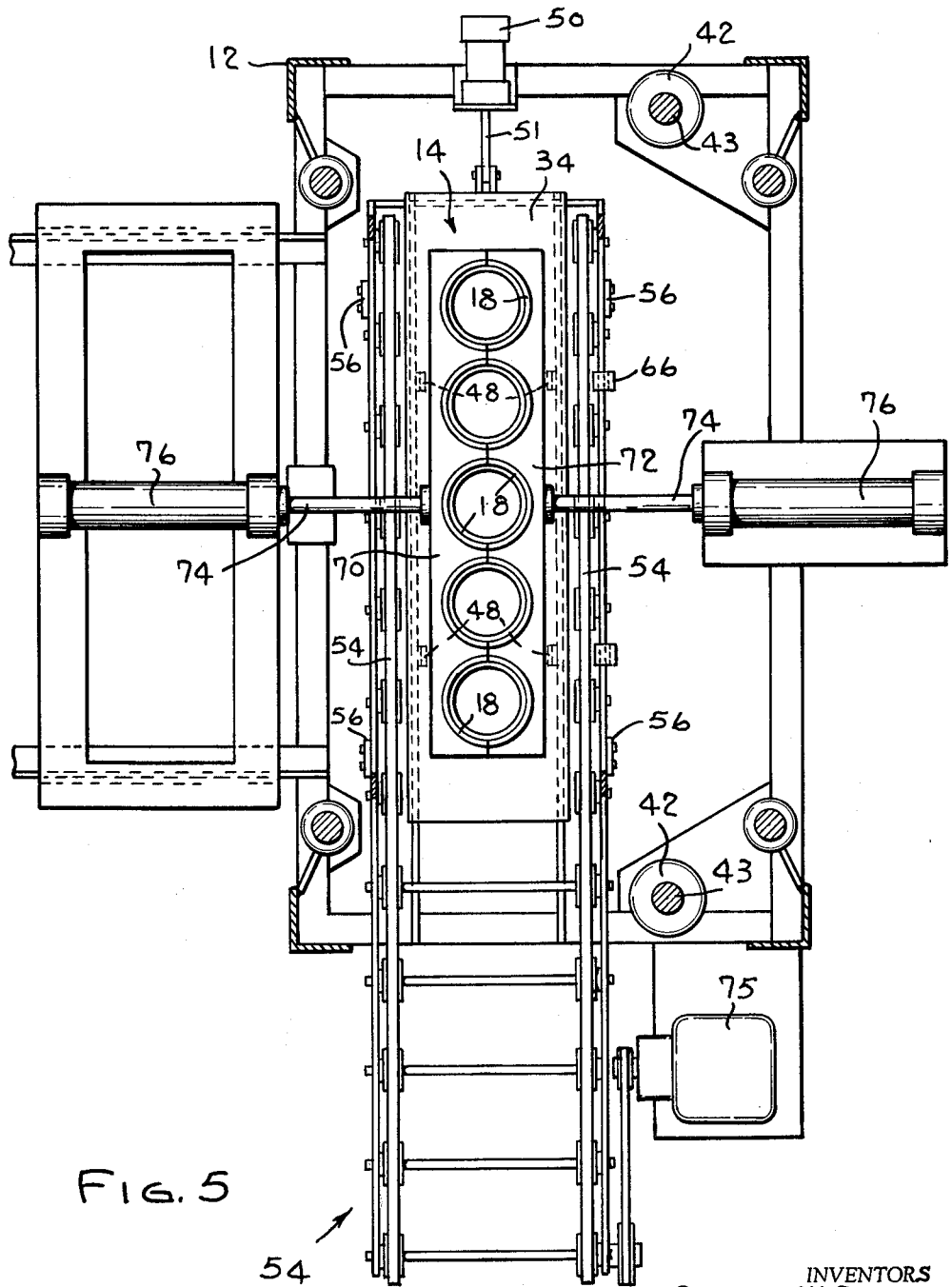
Figure 6:
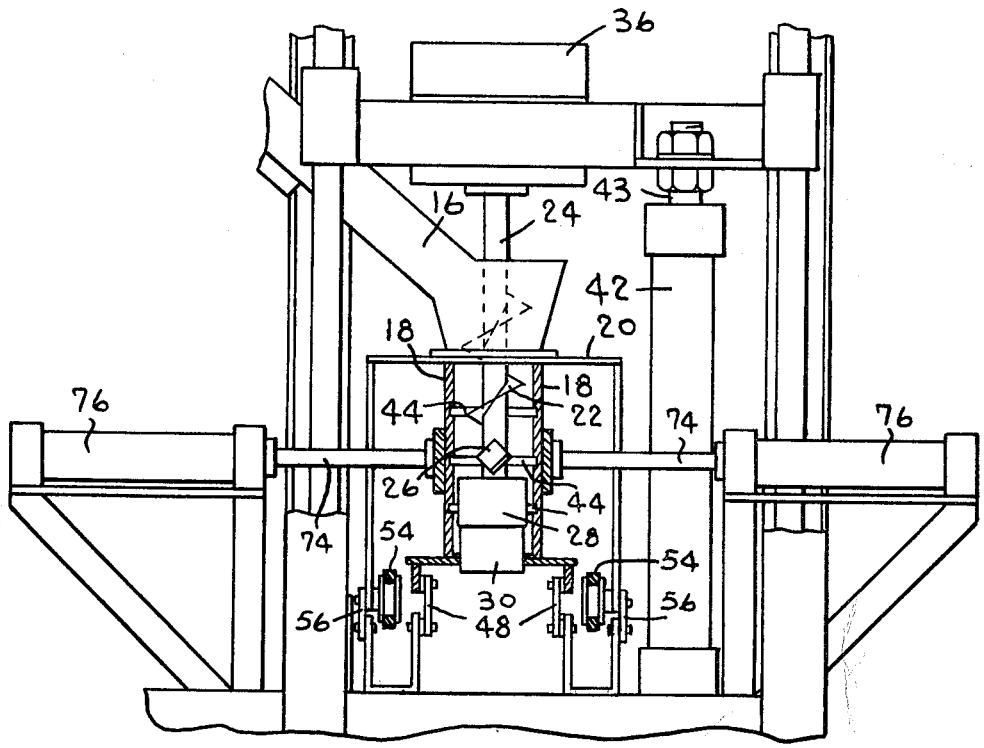
Figure 7:
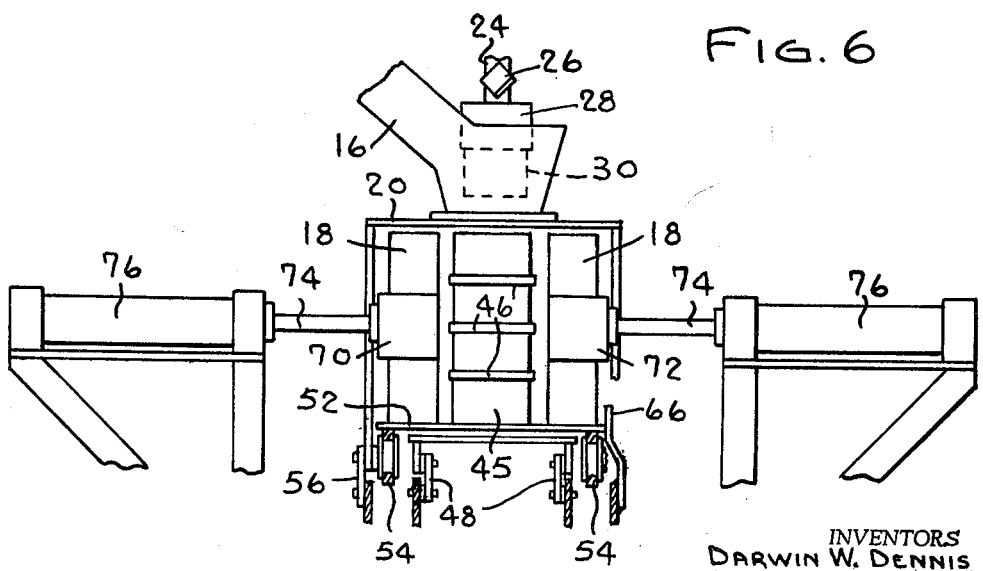

Other objects and advantages will be pointed out in, or be apparent from the specification and claims, as will obvious modifications of the embodiments shown in the drawings, in which:

FIG. 1 is an end view of the tile making machine with the packer head retracted;

FIG. 2 is a top view of the pallet conveyor;
FIG. 3 is a side view of the pallet conveyor;
FIG. 4 is a side view of a five tile mold with the concrete feed troughs partly broken away to show the concrete packer assembly;
FIG. 5 is a top view of the split can mold with the top die plate removed;
FIG. 6 is an end view of the tile making machine with the mold broken away to show the packer assembly;
FIG. 7 is an end view of the mold in the open position;
FIG. 8 is a schematic view of the tile machine with the mold closed and the packer assembly elevated;
FIG. 9 is a view similar to FIG. 8 with the packer assembly in position to receive the concrete;
FIG. 10 is a view similar to FIG. 8 with the packer assembly elevated and the die plates retracted; and
FIG. 11 is a view similar to FIG. 8 showing the mold open.

Referring more specifically to the drawings, the tile molding machine includes a concrete feed hopper 10 supported on frame 12 with an electrical feed control (not shown) to control the amount of concrete to be delivered to a multiple tile mold 14. The mold includes identical brackets 70, 72 which support a number of split drain tile cans 18. Five cans are shown in the drawing by way of example only. A number of funnels 16 corresponding to the number of tile cans in the mold are pivotally mounted on the hopper and rest on top of die plate 20 to direct the concrete from the hopper into the tile cans in the mold. Vibrator 21 is used to continually vibrate the hopper and funnels to keep the concrete moving from the hopper to the funnels to the mold during the time that the concrete feeder is operating. A small vibrator (not shown) may be mounted on the front of the funnels to keep the funnel clean.

The concrete is carried into the tile cans by tapered screw type conveyors 22 mounted on packer shafts 24 which extend to the bottom of the cans (FIG. 6). Slingers 26 at the lower end of the shaft force the concrete around the outside of packer shoes 28 which are bolted to the packer shaft and extend outward to compact the concrete against the inside surface of the can as the shafts are rotated. Packer heads 30 secured to the end of the packer shaft project through and cooperate with wear rings (not shown) in bottom die plate 34 to prevent the concrete from dropping out of the bottom of the can.

The packer shafts are driven by a drive mechanism (not shown) located in packer housing 36 which is mounted on bearings 38 for vertical motion on rods 40. Double acting cylinders 42 are mounted on the frame and are connected to the housing by piston rods 43 which are moved up or down in the cylinder to raise and lower the packer shafts in the mold. When the packer shaft is lifted out of the tile cans, the packer shoes will compact the concrete against the inside surface of the mold and the packer heads will wipe the inside surface of the drain tile leaving a smooth troweled finish therein. The concrete has zero slump with just enough water added to allow it to flow through the funnels into the tile cans. Rings 44 are cut into the surface of the cans to form flanges 46 on the outside of the finished drain tile 45 so that it will not slide out of the mold when the bottom die plate is lowered away from the mold.

As the packer shafts reach their upper limit of travel, the top die plate is lifted off of the mold by the motion of the conveyor. The funnels rest on the top die plate and are pivoted on the hopper so that they are raised clear of the top of the mold. The bottom die plate is supported on the frame by links 48 and is lowered by pressurizing double acting cylinder 50 which is connected to the bottom die plate by piston rod 51 to pull the plate toward the cylinder so that it pivots downward on the links away from the mold. A space is then opened between the bottom of the mold and the bottom die plate.

When the bottom die plate has reached the limit of its downward motion, a steel pallet 52 will be injected into the space between the mold and the bottom die plate and will rest on conveyor 54 which is supported on links 56. The pallets are injected into the mold by pressurizing one side of double acting cylinder 58 which is connected to pawls 60 and 64 by piston rod 65. The pawls are pulled across the bottom of pallet storage housing 62 moving a pallet from the housing unto rollers 63 to a loading position where it is picked up by pawls 64 and injected into the space above the conveyor. Stops 66 are provided on the opposite side of the conveyor to prevent overtravel of the pallet with respect to the mold. The conveyor is raised by pressurizing one side of double acting cylinder 68 which is connected to the conveyor by piston rod 69 to push the conveyor upward on links 56. The pallet will then be in position to support the tiles.

The mold is split into two sections with half of cans 18 supported in bracket 70 and the other half of the cans supported in bracket 72. The brackets are mounted on the end of piston rods 74 which are connected to double acting pistons in hydraulic cylinders 76. When the pallet has been moved into engagement with the bottom of the mold, the pressure in cylinders 76 will be reversed to move the mold sections away from the finished tiles. Vibrators (not shown) are used to aid in releasing the tile from the mold if desired. Motor 75 on the conveyor is then started to remove the pallet and tiles from the machine and any conventional means used to remove the pallet from the conveyor.

After the pallet clears the machine, the pressure in cylinders 76 is again reversed closing the mold. The conveyor and top die plate are dropped by reversing the pressure in cylinder 68 and the bottom die plate remains in the lower position. The mold is then ready for another cycle of operation.

In operation, the machine is run through a complete cycle by using the motion of the various operating parts to actuate a number of switches. The machine is considered in the neutral position (FIG. 8) when the conveyor and top die plate are down and the conveyor is turned off, the bottom die plate down, the mold closed, the packer housing up and the pallet injector forward. A cycle is started by closing a switch to lower the packer housing and raise the bottom die plate. The pallet injectors are also retracted (FIG. 9).

The packer housing during its downward motion will close a switch to start a feed timer in the concrete hopper to start feeding concrete to the funnels and will continue to feed concrete until the feed timer times out. A down timer for the packer housing will hold the packer housing down during the initial delivery of concrete to the mold and will start raising the packer housing before all of the concrete has been delivered to the mold. Raising of the packer housing will cause the packer shoes to form a tile in the mold and the packer head will wipe a finished surface to the inside of the drain tile. On reaching its upper position the packer housing will close a switch to lower the bottom die plate. Dropping of the bottom die plate will start the pallet injector to inject a pallet unto the conveyor (FIG. 10).

The pallet will actuate a switch to raise the conveyor and pallet into engagement with the bottom of the mold and lift the top die plate off of the mold. When the pallet engages the mold it will close a switch to open the mold and start the mold vibrators if used (FIG. 11). The conveyor motor is started by the opening motion of the mold to carry the tiles out of the machine. The pallet will actuate a switch on leaving the mold so that the mold will be again closed as in FIG. 8. The closing motion of the mold is used to start the next cycle so that the operation is completely automatic.

This machine is thus fully automatic and provides an extremely fast operating system for making drain tiles. The speed-up in production time and the reduction in wear and replacement parts has produced considerable savings both in time and unit cost as well as an overall reduction in maintenance cost.

Although only one embodiment of the present invention has been illustrated and described, it will be apparent to those skilled in the art that various changes and modifications may be made therein without departing from the spirit of the invention or from the scope of the appended claims.

We claim:

1. An automatic drain tile forming machine having mold filling means operably supplying tile forming material to vertically reciprocating packer means, comprising in combination:
    a mold having independent top, bottom and side sections in a casting position defining a cavity which is adapted to receive the packer means and the tile forming material to cast a tile in said cavity, said sections being movable outwardly from said position to free the cast tile;
    means for moving said bottom section outwardly while said side sections are in the said casting position;
    gripping means incorporated in said side sections to maintain the tile between said two side sections after removal of said bottom section;
    means for placing a pallet in contact with the underside of said side sections and the underside of the tile while said side sections are in said casting position;
    means for moving said side sections outwardly after they contact the pallet to allow the tile to freely rest on the pallet;
    means for moving said top section outwardly after the tile has been cast; and
    means for moving said sections in said casting position after the tile and pallet have been removed.

2. An automatic drain tile forming machine according to claim 1 wherein said means for placing a pallet in contact with underside of said side sections includes, conveyor means disposed below and removed from said side sections and means for raising said conveyor means after the removal of said bottom section, said conveyor means being adapted to support the pallet and place it in contact with said side sections and to remove said pallet and tile after the outward motion of said sections.

3. An automatic drain tile forming machine according to claim 2 wherein said side sections comprise two horizontally and oppositely movable half cylinders which are adapted to be moved apart to at least a distance equal to the outside diameter of the cast tile.

4. An automatic drain tile forming machine according to claim 3 wherein said gripping means comprises grooves in the inside surface of said half cylinders to provide flanges on the cast tiles.

5. An automatic drain tile forming machine according to claim 4 which has a plurality of packer means and an equal number of cavities defined by said top, bottom and side sections, and in which said conveyor means extends transversely to the direction of motion of said half cylinders.

6. An automatic drain tile forming machine having mold filling means operably supplying tile forming material to vertically reciprocating packer means, comprising in combination:
    a mold adapted to receive the packer means and tile forming material to cast a tile within said mold, said mold having two horizontally movable half-sections and movable bottom and top sections,
    means for removing said bottom section from underneath said half-section;
    gripping means on the inside surface of said half-sections to maintain in the cast tile between said half-sections after removal of said bottom section;

means for positioning a pallet in contact with the underside of said two half-sections after removal of said bottom section;

means for horizontally separating said two half-sections after the positioning of the pallet to leave the tile standing on the pallet, conveying means for horizontally moving the pallet out of the machine;

means for raising said top section before actuation of said conveying means; and means for moving said half-sections and top and bottom sections into the position in which the mold is adapted to receive the packer means and tile forming material.

7. An automatic drain tile forming machine having mold filling means operably supplying tile forming material to vertically reciprocating packer means, comprising in combination:

a mold adapted to receive the packer means and tile forming material to cast tile within said mold, said mold having two horizontally movable half-sections and vertically movable top and bottom sections;

conveyor means disposed below and spaced from said bottom section comprising two spaced rails and anti-friction means attached to said rails, said bottom section being operably supported between said two rails;

means for lowering said bottom section away from said half-sections;

gripping means on the inside faces of said half-sections to maintain the tile between said half-sections after removal of said bottom section;

means for positioning a pallet on said conveyor means;

means for moving said conveyor means upwardly to position the pallet in contact with said half-sections;

means for horizontally separating said half-sections after their contact with the pallet to leave the tile standing thereon, said half-sections being separated by the last mentioned means sufficiently far apart to permit the removal of the tile in a horizontal direction; and means for moving said half-sections, and top and bottom sections into the position when the mold is adapted to receive the packer means and tile forming material.

8. An automatic drain tile forming machine comprising:

a frame;

a plurality of vertically reciprocating packer means;

mold filling means operably supplying said packer means with tile forming material;

a mold adapted to receive said packer means and tile forming material to simultaneously cast a plurality of tiles within said mold, said mold having two half-sections movable horizontally and defining a plurality of cavities corresponding to the number of packer means, said mold also having a top and bottom section in contact with said half-sections when said mold is receiving the packer means;

conveyor means disposed below and spaced from said bottom section;

means for lowering said bottom section away from said half-sections;

means for positioning a pallet on said conveyor means;

means for moving said conveyor means upwardly to position the pallet in contact with said half-sections;

means for horizontally separating said half-sections after their contact with the pallet to leave the tile standing thereon, said half-sections being separated by the last mentioned means sufficiently far apart to permit the removal of the tile in a horizontal direction;

means to actuate said conveyor to horizontally remove the pallet and tile from the machine, means for raising said top section before the last mentioned actuation of said conveyor; and means for moving said half-sections, and top and bottom sections into the position when the mold is adapted to receive the packer means and tile forming material.

References Cited by the Examiner
UNITED STATES PATENTS

| | | | |
|---|---|---|---|
| 930,053 | 8/09 | Diefendorf | 25—41.3 |
| 1,116,080 | 11/14 | Gillard et al. | 25—36 |
| 1,424,469 | 8/22 | Gillard | 25—36 |
| 1,921,003 | 8/33 | Romie | 25—41 |
| 1,977,257 | 10/34 | Williams | 25—36 |
| 2,467,631 | 4/49 | Parker | 25—36 |
| 2,612,672 | 10/52 | Rifenburg | 25—36 |
| 3,032,853 | 5/62 | Burdette | 25—36 |
| 3,038,231 | 6/62 | Bergesen et al. | 25—36 |

ROBERT F. WHITE, *Primary Examiner.*